Nov. 25, 1958     P. T. JACKSON ET AL     2,861,416
TWINE AND ITS MANUFACTURE
Filed March 17, 1953     2 Sheets-Sheet 1
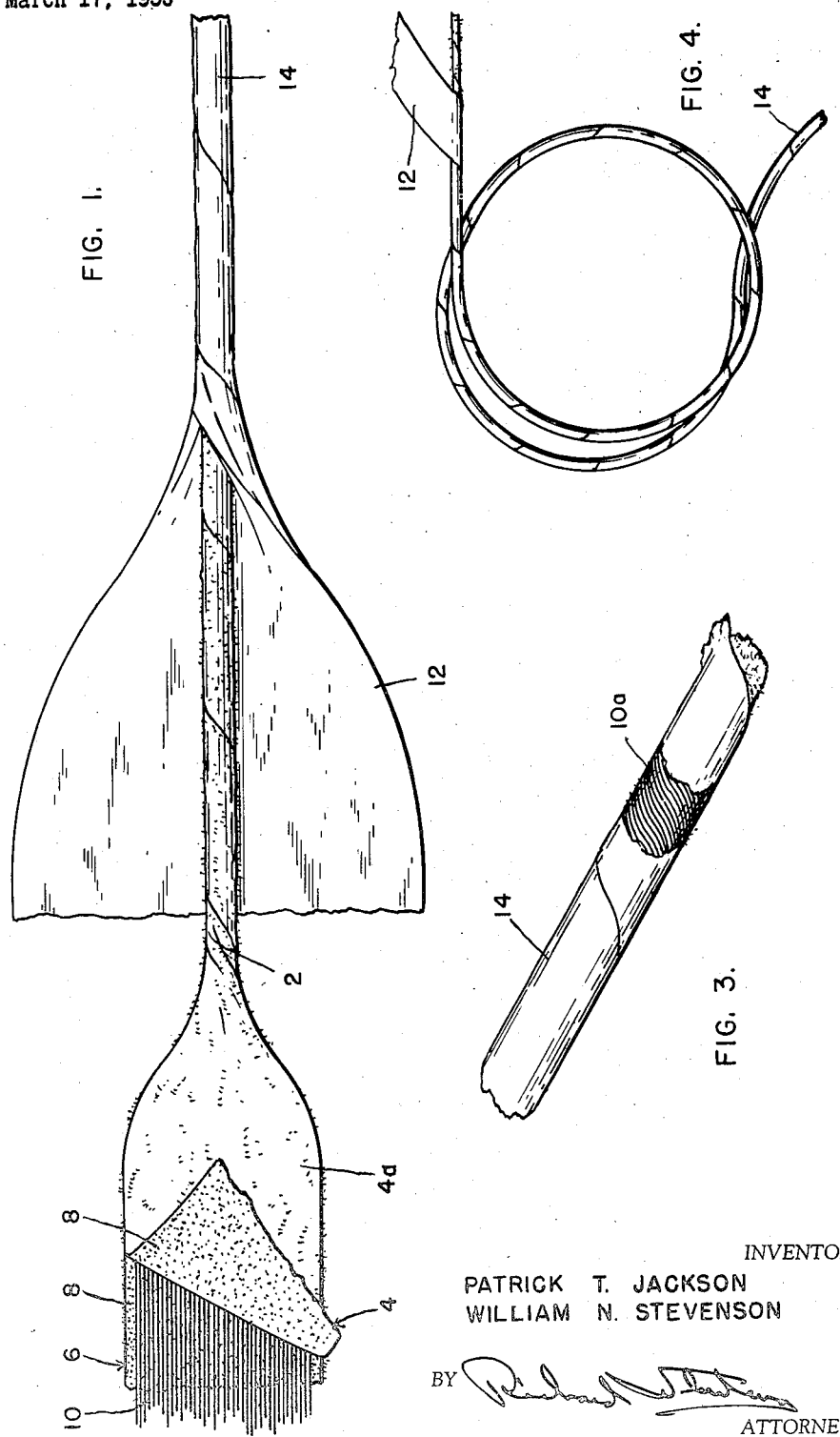
INVENTORS
PATRICK T. JACKSON
WILLIAM N. STEVENSON
BY
ATTORNEY Nov. 25, 1958　　　P. T. JACKSON ET AL　　　2,861,416
TWINE AND ITS MANUFACTURE
Filed March 17, 1953　　　　　　　　　　　　2 Sheets-Sheet 2
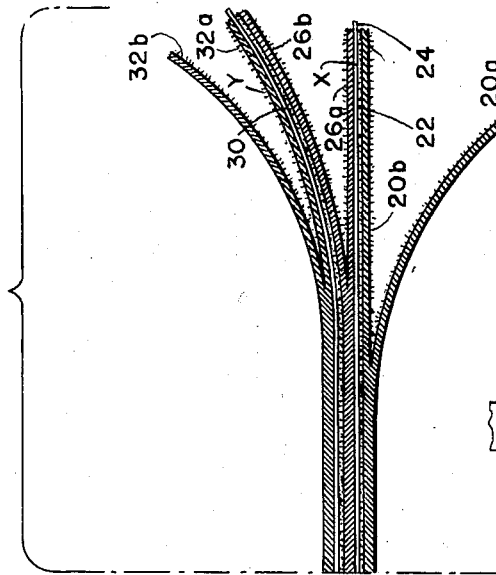
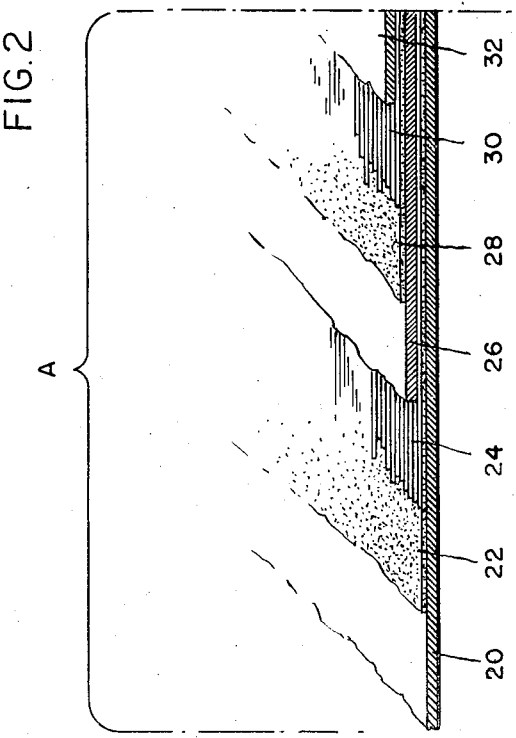
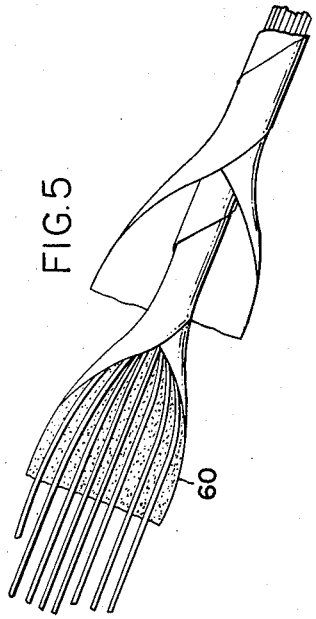
INVENTORS
PATRICK T. JACKSON
WILLIAM N. STEVENSON
BY
ATTORNEY

United States Patent Office 2,861,416
Patented Nov. 25, 1958

2,861,416

TWINE AND ITS MANUFACTURE

Patrick T. Jackson, Cambridge, and William N. Stevenson, Attleboro, Mass., assignors, by mesne assignments, to American Sisalkraft Corporation, a corporation of Delaware Application March 17, 1953, Serial No. 342,842

3 Claims. (Cl. 57—140)

This invention relates to yarn, twine, cordage, and the like, hereinafter referred to generically as twine, and its object is to provide a novel construction of fiber glass twine which obviates the problems of weakness in shear, low resistance to abrasion, and low elasticity of fiber glass, a material which otherwise is well adapted for use as twine because of its exceptional strength in tension.

A twine constituting a preferred embodiment of the present invention has a core composed of a pair of paper strips or ribbons, superimposed on each other and secured together by an interposed layer of adhesive in which fiber glass strands are embedded, the core being twisted about its axis so that the fiber glass strands are helically disposed. The paper strips are thin, tissue-like, narrow webs, well adapted for twisting and preferably are made by splitting an ordinary ply or kraft paper intermediate its thickness so that the split-ply strip thus formed presents on one of its surfaces a mass of protruding, short, paper fibers, many of which may have been torn in the splitting, the other surface being of lightly calendered texture conventional in kraft wrapping paper. In assemblying the strips the calendered surfaces of the strips are arranged innermost, juxtaposed opposite each other, and the fibrous surfaces are outermost.

The adhesive used to secure these strips together is preferably flexible throughout the temperature range encountered by the twine in use and it is desirably pressure-sensitive and tacky at room temperature. Preferably the adhesive is applied in substantial quantity so that it is adequate to embed and encase the fiber glass strands to protect them from rubbing against each other, thereby minimizing surface abrasion during subsequent twisting and use of the twine core; additionally, the quantity of adhesive is preferably adequate for penetration of adhesive through the paper strips sufficiently to make their outer surfaces somewhat tacky. The fibrous texture and the slight tackiness of these outer surfaces of the strips aid somewhat in securing the twist and also in retention of the outer sheathing in which the core is preferably enclosed.

The helical arrangement of the glass strands obtained by securing them between the paper strips prior to the twisting affords an enhanced resilience and extensibility in tension of the twine which is a property not present in a twine in which the glass is present solely as a straight central core about which paper is wrapped as a sheathing.

In the drawings:

Fig. 1 is a diagrmmatic illustration of the twine with its elements separated to indicate the construction;

Fig. 2 is a diagrammatic perspective view showing certain steps in the manufacture;

Fig. 3 is an enlarged diagrammatic perspective view of the twine broken away to show the fiber glass strands and their helical disposition;

Fig. 4 shows a typical baler twine of the present invention, in actual scale;

Fig. 5 is a diagrammatic view of a modified twine in which a single ply of paper is used to make the core, subsequently wrapped with the sheathing, and Fig. 6 is an enlarged diagrammatic view, in plan, of a guide reed for directing the strands.

The twine made in accordance with the preferred practice of the present invention is shown diagrammatically in Fig. 1 considerably enlarged. The core 2 is composed of two plies of paper 4 and 6 superimposed on each other and containing an interposed layer of adhesive 8. Glass strands 10 are disposed longitudinally of the strips 4 and 6, being laid in the adhesive 8. The structure formed of these elements is twisted to form the core 2 which is then preferably enclosed in a paper sheath 12 twisted about the core to form the finished twine 14. In order that the product may have adequate suppleness and flexibility so that it is readily manageable as a twine in the operations of wrapping, knotting and the like, its components, according to this invention, have the characteristics to be described.

Although the twine structure includes a number of plies of paper twisted together, its diameter may be small, typically about ⅛ of an inch or even less, comparable, for example, to the ordinary baler twine used principally for baling hay, straw and other bulk products, conventionally made of twisted hard vegetable fiber such as manila, sisal and the like formed as a twine of about ⅛" in diameter, with an average breaking strength of about 330 lbs. and, when tied into a knot in the customary manner, affording a knot strength of about 150 lbs.

The plies 4 and 6 are preferably made of split plies of kraft paper and the core assembly composed of the two plies of split kraft 4 and 6 with interposed adhesive 8 and fiber glass reenforcing strands 10 may conveniently be made in accordance with the method described in detail in the Stevenson application Ser. No. 266,415, filed January 14, 1952, now Patent No. 2,739,092.

Fig. 2 is an enlarged diagrammatic prespective view illustrating the procedure and in practice the two ply laminate from which the core 2 is made, is initially fabricated in substantial widths and thereafter cut into strips of narrow width for twisting to make the core 2.

Fig. 2 shows at A the steps of building up the laminate and at B the steps of splitting apart the laminations formed at A to form the split ply lamina. A kraft paper web 20 is coated with a layer of adhesive 22 on which is deposited a series of glass strands 24, the adhesive and the glass strands being desirably of special characteristics hereinafter referred to. Thereafter a further paper layer 26 is laid over the glass strands and by the adhesive 22 is firmly secured to the bottom layer of paper 20. There then follows a further layer of adhesive 28, an additional series of glass strands 30 and a further ply of paper 32. This process of building up the laminate continues with successive layers of paper, adhesive and glass strands until many layers are built up and a convenient way of accomplishing this is by using a single web of paper and depositing on its upper surface first the layer of adhesive 22 and then the series of glass strands 24 as the web of paper 20 is led through the machine to a storage roll where it is wound on itself to form a roll having successive layers of paper, adhesive and glass strands formed by the successive convolutions of the material in the roll. This procedure is described in more detail in the Stevenson application above referred to. The material is left in the roll until the adhesive in its successive layers has had time to set up to secure the successive layers of paper, with intervening glass strands, firmly to each other.

There then follows a process of splitting the roll apart to form the product, as diagrammatically indicated at part B of Fig. 3. The bottom ply of paper 20 is split intermediate its thickness to form two plies 20a and 20b; the ply 20b forms the bottom ply of a laminate generally designated at X which includes the split ply 20b, the layer of adhesive 22, the glass strands 24 and a ply 26a consisting of the lower part of the paper ply 26 which has also been split apart intermediate its thickness. The upper portion of the ply 26, designated 26b, forms the lower split ply of a further laminate Y having adhesive 28 and glass fiber strands 30 and completed by the upper ply 32a which has been split away from the starting paper ply 32.

The lamina X, Y, etc. are then cut into the widths desired for the strip or ribbon lamina from which the core 2 is twisted. The plies 4 and 6 (Fig. 1) from which the core is made thus have an aggregate thickness equal to the thickness of a single ply of starting kraft paper.

The splitting of the paper plies contributes to the flexibility and suppleness of the twine otherwise than solely as a matter of paper thinness or lack of bulk. The plies produced are softer and more supple in texture than sheets of the same thickness which have been calendered on both sides in the way ordinary kraft is finished. The plies yield readily to the twisting operation. The splitting operation tears the fibers away from the body of the sheet so that the surfaces 26a and 20b, for example, of the laminate X present a mass of protruding, short paper fibers, many of which have been torn, indicated by the fibrous character of the surfaces, which aids in the formation of a smoothly twisted core.

The thinness of the paper plies 4 and 6 also permits some seepage of adhesive through these plies so that the outer surfaces of the plies, typically designated at 4a, are somewhat tacky, which contributes to the preservation of the twist of the core.

Although unsplit plies of paper such, for example, as a 14 lb. per ream twisting tissue, may be employed, we prefer the split ply lamina for reasons above stated, using, for example, a starting kraft, before splitting, of a basis weight of about 30. These values, of course, may be widely varied.

The adhesive employed may be of the ordinary solvent plastic type or it may be thermoplastic, but we have found that best results have been obtained if the adhesive is of the pressure-sensitive type which remains flexible and somewhat tacky throughout the temperature range to which the twine will be subjected in use. Such a pressure-sensitive adhesive is a highly plasticized adhesive substance, such as a water-soluble or water-insoluble gum or resin, containing sufficient plasticizer to remain tacky after evaporation of any volatile solvent or water with which the adhesive is applied. Any pressure-sensitive adhesive known in the art may be employed, including those well plasticized adhesives which are heated to impart increased fluidity for application to the paper. Typical of an adhesive of high flexibility is one composed of an elastomer combined with a thermoplastic resin, applied as an emulsion and subsequently gelated as disclosed in the Nickerson Patent No. 2,736,679 granted February 28, 1956.

The quantity of adhesive employed is preferably greater than a mere superficial coating which might be adequate to adhere the paper plies together because we have found that enduring strength of the twine is contributed to by so embedding the fiber glass strands in adhesive that they are kept from abrading each other by being encased in a protective sheathing of the adhesive. The glass fiber strands are preferably kept separate fom each other as they are laid in place, for which purpose a reed or other comb-like mechanism common in the textile industry may conveniently be employed. Such a reed is shown in Fig. 6 at 50 having teeth 52 separated by interdental spaces 53 through which the strands 10 are guided. Any precise separation is of course not required and in practice we may feed two or more strands through a single interdental space in the reed, but bunching of the strands which would result in their abrading each other in the use of the twine is to be avoided. A typical disposition of the strands is one employing 56 strands per inch using a reed having 28 slots through which are guided two strands per slot. The fiber glass strands are available as a commercial product and as disclosed in U. S. Pat. 2,133,238 granted October 11, 1938, to Slayter and Thomas, may consist of 40 to 60 fine glass fibers having an average diameter of the order of .0004 inch, the fibers being twisted in order to produce a strand of substantial flexibility, mass integrity, strength and stretchability, which characteristics aid in knotting the twine without rupture of the strand.

The core thus formed may be provided with an outer sheath 12 of a thin kraft or the like twisted about the core and in this operation further twist may be imparted to the core, if desired.

Continuing the comparison with an ordinary baler twine, to make a twine of about ⅛" diameter, the strips 4 and 6 may be about 1" in width, strip 12 may be about 2" in width and there may be about 18 twists per foot in the core and sheathing. The resulting twine may typically include in its composition about 40% glass by weight, 26% paper and 27% adhesive. It has an average tensile strength of about 370 lbs. and a knot strength of about 140 lbs.; moreover, the twine may be manufactured from material readily available, at a cost comparing advantageously with the average cost of hard fiber baler twine made of materials which are not always readily available.

Fig. 3 is an enlarged diagrammatic view in which the paper plies have been torn away to show diagrammatically the strands designated 10a in the helical configuration imparted to them as the result of their having been adhered between the paper plies 4 and 6 prior to the twisting operation to form the core 2. In the example illustrated, the twisting is of the order of about 2 turns per inch and as the result of the helical disposition of the strands thus obtained, the twine has a resilience in tension not obtainable if the strands extended longitudinally through the twine as a straight core. Furthermore, the twine has a greater residual strength after being sharply bent or knotted because the helical configuration of the strands enables the twine more readily to take stresses which otherwise would tend to break the glass strands because of their inherent brittleness and low resistance to shear.

As a further modification, one of the paper plies of the core may be dispensed with and an aggregate consisting of a single ply of paper 60 (Fig. 5) with superimposed adhesive and fiber glass strands may be twisted directly into the form of a core, preferably with added sheathing. However, we prefer the two ply laminate, particularly of split ply paper.

The invention which has been described in its preferred modification is subject to a number of modifications to suit the needs of particular users, although for best results certain limiting characteristics should be observed. Thus, the amount of twist in the core is preferably about 1 to 2 turns per linear inch, usually about 1.4 to about 1.8 turns; the glass fiber strands should be distributed fairly uniformly width-wise of the strip, using a large number of ends per inch; although as few as 5 or 10 glass strands per inch may serve for some purposes, we prefer up to 80 or even 100 ends per inch for most purposes. The adhesive should have enough elastomeric content to cushion the fibers against shearing and resist fracture of the fibers when twisted into twine.

We claim:

1. A twine comprising a pair of thin paper strips each presenting on one of its surfaces a mass of protruding short, torn paper fibers and on the other surface a substantially smooth, less fibrous texture, the strips being superimposed on each other with their less fibrous surfaces disposed innermost and facing each other, secured together by an interposed layer of adhesive which is flexible at room temperature, reenforcing strands secured between the strips and longitudinally thereof, the strip and strand assembly being twisted about a lengthwise axis so that the strands are arranged in helical convolutions.

2. The twine as defined in claim 1 in which a sheath of paper encloses and is secured about the twisted pair of strips as a core.

3. The method of manufacturing a twine which includes the steps of superimposing a plurality of sheets of paper with interposed alternate layers of adhesive in which reenforcing strands are deposited, setting up the adhesive to secure the superimposed sheets together, thereafter splitting the sheets intermediate the adhesive coatings to produce laminates each having split plies of paper constituting its outer exposed faces, slitting the laminates into strips in which the reenforcing strands run lengthwise of the strip and twisting the strip along a lengthwise axis to form a twine in which the strands are arranged in helical convolutions.

References Cited in the file of this patent

UNITED STATES PATENTS

| | | |
|---|---|---|
| 2,142,308 | Dressel | Jan. 3, 1939 |
| 2,250,776 | Sackner | July 29, 1941 |
| 2,407,926 | Hamilton | Sept. 17, 1946 |
| 2,532,923 | Kitchen | Dec. 5, 1950 |
| 2,604,424 | Mathes | July 22, 1952 |
| 2,664,374 | Slayter et al. | Dec. 29, 1953 |
| 2,671,306 | Slayter | Mar. 9, 1954 |
| 2,707,367 | Pullman | May 3, 1955 |
| 2,707,499 | Pullman | May 3, 1955 |
| 2,736,163 | Morrison | Feb. 28, 1956 |
| 2,739,092 | Stevenson | Mar. 20, 1956 |